(12) United States Patent
Ohkuma et al.

(10) Patent No.: US 6,796,714 B2
(45) Date of Patent: Sep. 28, 2004

(54) ROLLING-BEARING UNIT FOR WHEEL SUPPORT

(75) Inventors: Takeo Ohkuma, Fujisawa (JP); Eishi Shibuya, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/005,872

(22) Filed: Dec. 7, 2001

(65) Prior Publication Data

US 2002/0085781 A1 Jul. 4, 2002

(30) Foreign Application Priority Data

Dec. 18, 2000 (JP) .......................................... 2000-384077
Sep. 11, 2001 (JP) .......................................... 2001-274683

(51) Int. Cl.[7] .............................................. F16C 19/38
(52) U.S. Cl. ........................................ 384/585; 384/589
(58) Field of Search ................................ 384/585, 589, 384/586, 537, 544

(56) References Cited

U.S. PATENT DOCUMENTS 6,113,279 A 9/2000 Sawai et al.

FOREIGN PATENT DOCUMENTS

| DE | 3418440 | 11/1985 |
| EP | 0854303 | 7/1998 |
| GB | 1267394 | 3/1972 |
| WO | 98/58762 | 12/1998 |
| WO | 01/48390 | 7/2001 |

*Primary Examiner*—Lenard A. Footland
(74) *Attorney, Agent, or Firm*—Crowell & Moring LLP

(57) ABSTRACT

A rolling-bearing unit for wheel support comprising an outer-race with a double row of tapered and concave-shaped outer-ring raceways, a hub comprising a hub body with an outside inner-ring raceway and a separate inner-race with an inside inner-ring raceway, and a tapered rollers between the inner-ring raceways and the outer-ring raceways respectively, the hub body formed with a cylindrical section, and a support-step section which the separate inner-race is fitted onto, the cylindrical section plastically deformed radially outward to form a crimped section, the support-step section formed with a step surface, one end surface of the separate inner-race abutted to the step surface while the other end surface retained by the crimped section, the inner-ring raceway of the separate inner-race connected to the side surface of the large-diameter-side collar section through a connecting portion which is provided with a grinding-relief groove, and wherein the contact area between the other end surface of the separate inner ring and the crimped section has a maximum diameter smaller than the diameter defined by the bottom of the grinding-relief groove.

3 Claims, 8 Drawing Sheets

ROLLING-BEARING UNIT FOR WHEEL SUPPORT

BACKGROUND OF THE INVENTION

1. Field of the Invention

This invention relates to a rolling-bearing unit for wheel support for supporting an automobile wheel such that it rotates freely with respect to the suspension.

2. Description of the Related Art

A rolling-bearing unit for wheel support is used for supporting automobile wheels such that they rotate freely with respect to the suspension. FIG. 6 shows a first example of a rolling-bearing unit for wheel support that was previously considered for this purpose. This rolling-bearing for wheel support comprises an outer-race 1, a hub 2 and a plurality of rolling elements 3a, 3b. Of these, the outer-race 1 has a double row of outer-ring raceways 4a, 4b formed around its inner peripheral surface and an installation section 5 formed around its outer peripheral surface for fastening to the suspension. Moreover, the hub 2 is located radially on the inside of the outer-race 1 such that it is concentric with the outer-race 1.

There is a flange 6 formed around the outer peripheral surface on the outside end (This is the outside end in the axial direction which is on the outside in the width direction of the vehicle when the bearing is installed in the automobile, and is the left end in the figures.) of this hub 2 for supporting and fastening to the wheel, and a double row of inner-ring raceways 7a, 7b are formed around its outer peripheral surface. In addition, there is a plurality of rolling elements 3 between the inner-ring raceways 7a, 7b and the outer-ring raceways 4a, 4b, and they are held in place by synthetic resin or metallic retainers 8 such that they rotate freely.

The construction shown in FIG. 6 and FIG. 7 is provided for supporting a wheel of a relatively heavy vehicle, so tapered rollers are used as the rolling elements 3a, 3b, and the cross-sectional shape of the outer-ring raceways 4a, 4b and the inner-ring raceways 7a, 7b is formed in a straight manner.

Moreover, the hub 2 is formed by combining a hub body 9 and a pair of inner-races 10a, 10b, and the aforementioned inner-ring raceways 7a, 7b are formed around the outer peripheral surface of these inner-races 10a, 10b. In order to combine the hub body 9 with the pair of inner-races 10a, 10b, a support step section 11 is formed around the outer peripheral surface of the hub body 9 from the middle to the inside end (This is the inside end in the axial direction which is the end toward the middle in the width direction of the vehicle when the bearing is installed in the automobile, and is the right end in the figures.). The pair of inner-races 10a, 10b is tightly fitted around (pressure fitted) around this support step section 11 through interference fit. Furthermore, a crimped section 13 that is formed by plastically deforming a cylindrical section 12 is formed on the inside end of the hub body 9, and the inside end surface of the inner-race 10b on the axial inside is retained by the crimped section 13. A step section 14 is located on the outside end of the support step section 11, and by holding the pair of inner-races 10a, 10b between the crimped section 13 and the step section 14, the inner-races 10a, 10b are fastened to the hub body 9. Also, with the inside end of the inner-race 10b held by the crimped section 13, a pre-load is applied to the bearing section comprising the rolling elements 3 and raceways 4, 7. Construction, in which the technique of holding the inside end of the inner-race with a crimped section is applied to a tapered roller bearing, is disclosed, for example, in International Patent Publication WO 98/58762.

As shown in FIG. 7, for the rolling-bearing unit for wheel support that is the object of this invention, the inner-ring raceway 7a may also be formed directly around the outer peripheral surface in the middle section of the hub body 9 of the hub 2. In this case, a support step section 11 on which one inner-race 10b is fitted and fixed is formed on only the inside end of the outer peripheral surface of the hub body 9, and a step section 14a for coming in contact with the outside end of this inner-race 10b is formed on the hub body 9 itself.

It will be noted that in the case of the pair of inner-races 10a, 10b shown in FIG. 6, the surface of the inside end of the outside inner-race 10a corresponds to the aforementioned step section 14a.

Moreover, in the example shown in the figures, there is a spline hole 15 formed in the center of the hub body 9 of the rolling-bearing unit for supporting the drive wheels. Furthermore, there are seal rings (assembled seal rings) 16a, 16b between the inner peripheral surface on both ends of the outer-race 1 and the inner-races 10a, 10b, and they cover the openings on both ends of the space 17 where the rolling elements 3a, 3b are located.

In the case of the second example shown in FIG. 7, the seal ring 16a, which covers between the outside end of the outer-race 1 and the middle section of the hub 2, is fitted around the outside end of the outer-race 1.

When a rolling-bearing unit for wheel support that is constructed in this way is installed in an automobile, the aforementioned installation section 5 is connected to and fastened to a knuckle or the like of the suspension, and fastens a wheel to the flange 6. In this way, the wheel is supported such that it rotates freely. Also, a spline shaft that is an accessory of a constant-velocity joint (not shown in the figure) is inserted in the spline hole 15 such that the wheel can be rotated and driven freely by way of the hub body 9.

A technique for simplifying the work of forming the crimped section 13 for fastening the inner-races 10a, 10b to the hub body 9, where the inner-races 10a, 10b are fitted around the outer peripheral surface of the hub body 9, is disclosed in West German Patent No. DE3418440A1, and is shown in FIG. 8 and FIG. 9. In the case of the construction disclosed in this disclosure, in order to form the crimped section 13 for retaining the surface on the inside end of the inner-race 10b, concave grooves 18a, 18b are formed in the circumferential direction around the inner and outer peripheral surfaces on the outside end of the cylindrical section 12 that is formed on the inside end of the hub body 9. Of these, the concave groove 18b that is formed around the outer peripheral surface of the outside end of the cylindrical section 12, is a small-diameter section as explained later. Since the concave grooves 18a, 18b are formed to reduce the thickness of the cylindrical section 12, which becomes the bent section when forming the crimped section 13, it is easy for the cylindrical section 12 to deform plastically. Therefore, it is possible perform processing of the crimped section 13 without heating the cylindrical section 12.

The construction shown in FIG. 8 and FIG. 9 is for supporting the wheel of a relatively lightweight automobile, so balls are used as the rolling elements 3a, 3b, and the cross-sectional shapes of the outer-ring raceways 4a, 4b and inner-ring raceways 7a, 7b are formed in an arc-shape manner.

In the case of the prior art construction shown in FIG. 6 and FIG. 7, the relationship between the diameter of the inner-ring raceway 7a, 7b that is formed around the outer peripheral surface of the inside inner-race 10b and the diameter of the crimped section 13 is not particularly regulated, so it was difficult to maintain durability as well as reduce the size and weight. The reason for this is as follows. A large outward axial load is applied to the surface on the inside end of the inner-race 10b when forming the crimped section 13. In addition, when this axial load is applied to the large-diameter-side collar 27 that is formed around the outer peripheral surface on the inside end of the inner-race 10b, a moment load is applied to the base (inner-diameter-side end) of this large-diameter-side collar 27 in the direction that causes a portion of this large-diameter-side collar 27 near the outer periphery to displace axially outward. On the other hand, in order to prevent interference with the grind stone when finishing the outside surface of the large-diameter-side collar 27 and inner-ring raceway 7b, a grinding-relief groove 28, as shown in FIG. 10, is formed in the section that connects the surface on the outside end of this large-diameter-side collar 27 with the inner-ring raceway 7b. Therefore, when a moment load is applied to the large-diameter-side collar 27, stress is concentrated at this grinding-relief groove 28, making it easy for damage such as cracking to occur in this section.

Conventionally, in order to prevent damage from occurring due to this reason, the thickness in the axial direction of the large-diameter-side collar 27 was made sufficiently large in order to suppress elastic deformation of the large-diameter-side collar 27 regardless of the aforementioned moment load, and to keep the stress applied to the grinding-relief groove 28 at a minimum. Therefore, the length dimension in the axial direction of the inner-race 10b having the aforementioned large-diameter-side collar 27 was increased more than required for as a component for a rolling-bearing unit for wheel support, and thus the dimension in the axial direction of the rolling-bearing unit for wheel support was increased by that amount, making it difficult to make the bearing unit more compact and lightweight.

In the case of the prior construction shown in FIG. 8 and FIG. 9, the inventors found through testing that a large load was applied outward in the radial direction to the inside end of the inner-race 10c when forming the crimped section 13 by plastically deforming the cylindrical section 12 outward in the radial direction. The reason for this will be explained using FIG. 8, FIG. 9 and FIG. 11.

As shown in FIG. 8 and FIG. 9, when the cylindrical section 12 on which a concave groove 18b is formed around the outer peripheral surface of its outside end (base end) is deformed plastically outward in the radial direction, a protrusion 19 as shown in FIG. 11 is formed in the section corresponding to the outside edge (starting point) of the concave groove 18b on the outer peripheral surface of the cylindrical section 12. It should be noted that FIG. 11 shows the axial direction (left and right direction in FIG. 11) at a magnification rate of about 10×, and shows the radial direction (up and down direction in FIG. 11) at a magnification rate of about 1000×. In the case of a general rolling-bearing unit for wheel support of an automobile, the width $W_{19}$ of the protrusion 19 is about 0.1 to 0.2 mm, and the height $H_{19}$ of the protrusion 19 is about 0.001 to 0.10 mm.

On the other hand, in the case of the prior art shown in FIG. 8 and FIG. 9, the outside edge of the concave groove 18b faces the cylindrical section 12, which is a section on the inner peripheral surface of the inner-race 10b, and the inner diameter of which does not change with respect to the axial direction. Therefore, before forming the crimped section 13, the outside edge of the concave groove 18b comes in close contact with the inner peripheral surface of the inner-race 10b. When forming the crimped section 13a from this state by plastically deforming the cylindrical section 12 outward in the radial direction, the protrusion 19 strongly presses the inner peripheral surface on the inside end of the inner-race 10b outward in the radial direction, and plastically deforms the inside end of this inner-race 10b outward in the radial direction although a little. Also, in the case of elastic deformation, the cross-sectional shape or diameter of the inner-ring raceway 7b that is formed around the outer peripheral surface of the inner-race 10b, changes a little from the desired one, and there is a possibility that the pre-load applied to the rolling elements 3a, 3b will be a little off from the proper value.

Furthermore, in the case that the prior art shown in FIG. 8 and FIG. 9 is applied to a rolling-bearing unit for wheel support that is a double-row tapered roller bearing unit as shown in FIG. 6 and FIG. 7, the crowning that is performed on the inner-ring raceway 7b around the outer peripheral surface of the inside inner-race 10b is either reduced or lost, which results in the possibility of edge loading occurring on part of the contact area between the inner-ring raceway 7b and the rolling contact surface of each rolling element 3b. In other words, since the crowning that was performed for preventing the occurrence of edge loading of the inner-ring raceway 7b is lost, prevention of edge loading become uncertain. That is, of the crowning performed on the inner-ring raceway 7b, the crowning amount performed on near the inside end in the axial direction is decreased or lost. As a result, it becomes easy for high surface pressure due to edge loading to be applied at the area of contact between the inside end of the inner-ring raceway 7b and the inside end of the rolling contact surface of each rolling element 3b. The high surface pressure due to this kind of edge loading is a cause of shortened rolling fatigue life of the inner-ring raceway 7b and is not desirable.

SUMMARY OF THE INVENTION

The rolling-bearing unit for wheel support of this invention was invented by taking the problems described above into consideration.

An object of the present invention is to provide a rolling-bearing unit for wheel support wherein by making it impossible for a moment load to be applied to this large-diameter-side collar 27 when processing the crimped section 13, it is possible to keep the thickness of the large-diameter-side collar 27 and the length dimension of the inner-race 10b to that which is basically required for components of a rolling-bearing unit for wheel support, and thus it is easier to make the rolling-bearing unit for wheel support more compact and lightweight.

Another objective of this invention is to make it easier to construct a rolling-bearing unit for wheel support that is more compact and lightweight by not applying a moment load to the large-diameter-side collar 27 when processing the aforementioned crimped section 13.

DETAILED DESCRIPTION OF THE INVENTION

Figure 6:
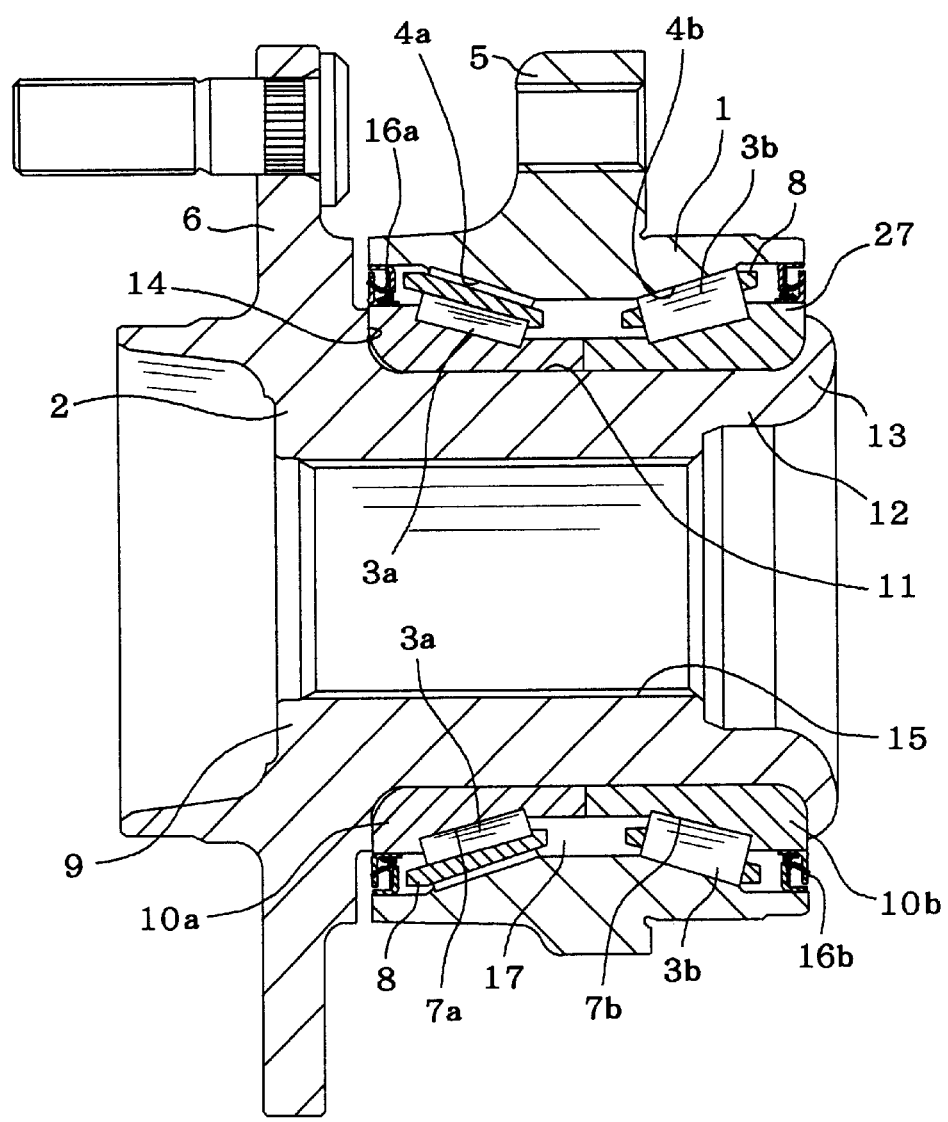
FIG. 6 is a cross sectional view of a first example of the structure to which this invention is applied.
Figure 7:
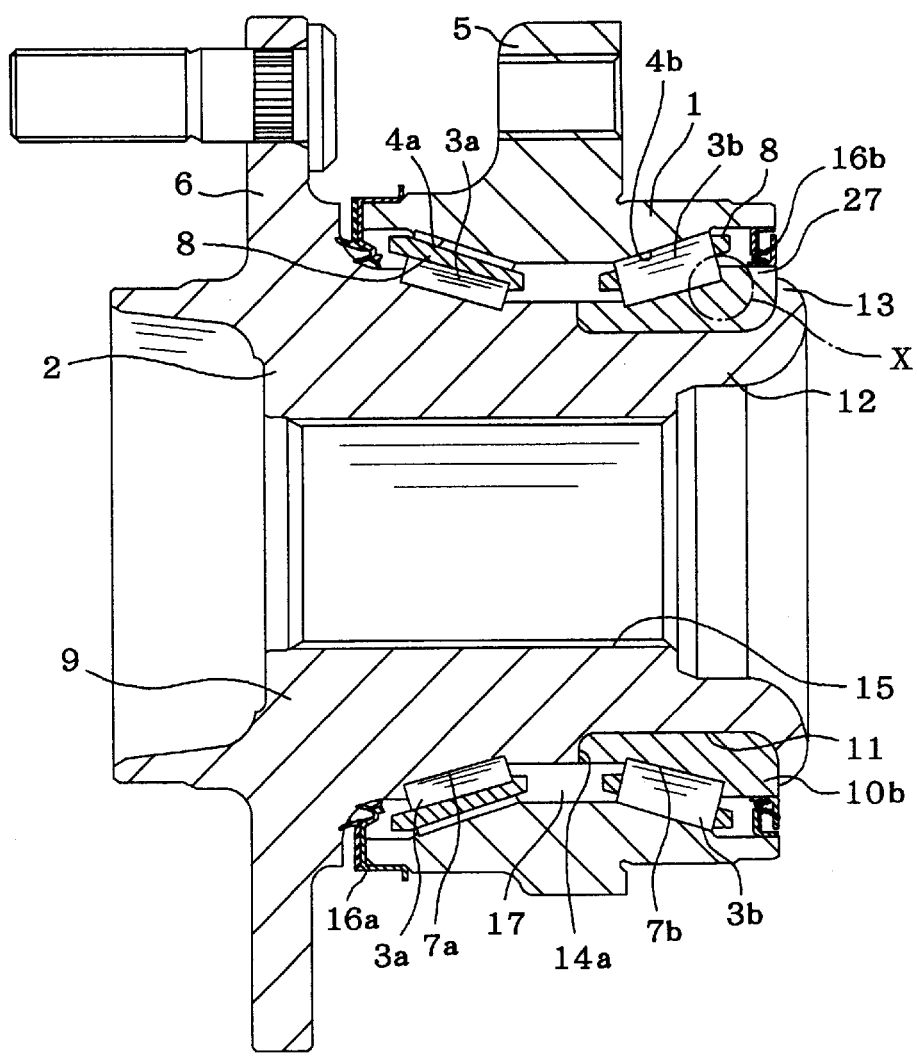
FIG. 7 is a cross sectional view of a second example of the structure to which this invention is applied.

Of the rolling-bearing units for wheel support of this invention, the rolling-bearing unit for wheel support described in a first feature comprises: similar to the previously considered rolling-bearing unit for wheel support described above and shown in FIG. 6 and FIG. 7; an outer-race having a double row of tapered and concave-shaped outer-ring raceways formed around its inner peripheral surface; a hub having a double row of tapered and convex-shaped inner-ring raceways formed around its outer peripheral surface; and a double row of tapered rollers that are located between the inner-ring raceways and outer-ring raceways such that they rotate freely.

Also, the hub comprises: a hub body having the outside inner-ring raceway formed directly, or by way of an inner-race, around the middle of its outer peripheral surface; and a separate inner-race having the inside inner-ring raceway formed around its outer peripheral surface. Of these, the hub body has a flange formed around its outer peripheral surface at a portion closer to the outside end for supporting the wheel, and a support-step section formed around at least a portion on the inside end of its outer peripheral surface which the separate inner-race is fitted around.

Moreover, the separate inner-race has a surface on the outside end of the separate inner race which is brought in contact with the step surface that is located on the outside end of the support-step section while the hub body has a cylindrical section located on the inside end of the hub body. A crimped section is formed by plastically deforming the cylindrical body outward in the radial direction. Thus, the separate inner race is supported and fastened to the hub by retaining the inside surface of the separate inner race with the crimped section.

Furthermore, the inner-ring raceway is formed around the outer peripheral surface of the separate inner-race such that the diameter increases toward the inside end, and a large-diameter collar section is formed around the inside end. A grinding-relief groove is formed in the section that connects the inner-ring raceway and the surface on the side of the large-diameter collar section.

Particularly in the case of the rolling-bearing unit for wheel support of this invention, the maximum outer diameter of the section where the surface on the inside end of the inner-race comes in contact with the crimped section is smaller than the diameter of the bottom of the grinding-relief groove.

Of the rolling-bearing units for wheel support of this invention, the rolling-bearing unit for wheel support described in a second feature, comprises: similar to the previously considered rolling-bearing unit for wheel support described above and shown in FIG. 6 and FIG. 7; or similar to the previously known rolling-bearing unit for wheel support described above and shown in FIGS. 8 and 9, an outer-race having a double row of outer-ring raceways formed around its inner peripheral surface; a hub having a double row of inner-ring raceways formed around its outer peripheral surface; and a plurality of rolling elements that are located between the inner-ring raceways and outer-ring raceways, respectively, such that they rotate freely.

Also, the hub comprises: a hub body having the outside inner-ring raceway formed directly, or by way of an inner-race, around the middle of its outer peripheral surface; and a separate inner-race having the inside inner-ring raceway formed around its outer peripheral surface. Of these, the hub body has a flange formed around its outer peripheral surface at a portion closer to the outside end for supporting the wheel, and a support-step section formed around its outer peripheral surface at least on the inside end which the separate inner-race is fitted around.

Moreover, a step surface is located on the outside end of the support-step section, and a cylindrical section is located on the inside end of the hub body. A crimped section is formed by plastically deforming the cylindrical section of the hub body outward in the radial direction, and the surface on the outside end of the separate inner-race is brought in contact with the step surface of the support-step section. Thus, the separate inner race is supported and fastened to the hub by retaining the inside end surface of the separate inner race with the crimped section.

Figure 8:
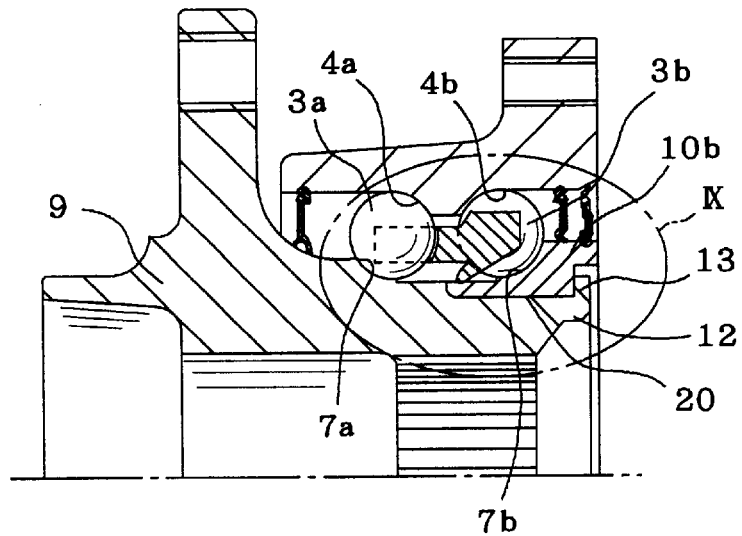
FIG. 8 is a cross sectional view of a half of a first example of the prior art structure by which the process to form the crimped portion is made easy.
Figure 9:
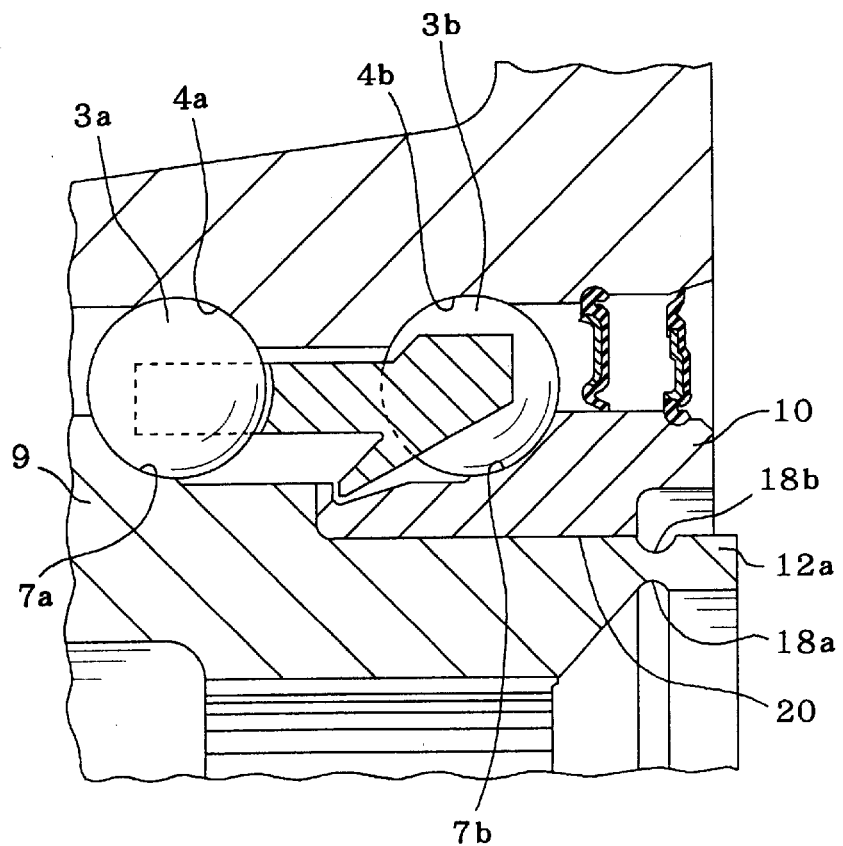
FIG. 9 is an enlarged view of Portion IX in FIG. 8 to show the state before the crimped portion is formed.

Furthermore, similar to the prior art rolling-bearing unit for wheel support shown in FIG. 8 and FIG. 9, a small-diameter section is formed around the outer peripheral surface at least on the outside end of the cylindrical section. This cylindrical section is the section for forming the aforementioned crimped section, so even when a section having the same shape as this cylindrical section is extended further outward, the outside end of the section where the crimped section is formed is the outside end of the cylindrical section.

Particularly in the case of the double-row rolling bearing unit for wheel support described in the second feature, a beveled section is formed on the inner peripheral surface of the inside end of the separate inner-race such that its inner diameter becomes larger toward the inside end. In addition, the outside edge (starting point) of this small-diameter section is located axially on the inside than this beveled section.

Moreover, it is preferable that the inside edge (ending point) of the small-diameter section is located axially on the inside than the inside end surface of the separate inner-race before the cylindrical section has been plastically deformed.

Of the rolling-bearing units for wheel support of the invention described above, the rolling-bearing unit for wheel support described in the first feature makes it possible to prevent a moment load from being applied to the large-diameter-side collar when processing the crimped section, so that the rolling-bearing unit for wheel support is made more compact and lightweight.

In other words, since the maximum diameter of the section where the inside end surface of the inner-race comes in contact with the crimped section is smaller than the diameter of the circle defined by the bottom of the grinding-relief groove, the axial load applied to the inside end surface of the inner-race from the crimped section is not applied to the large-diameter-side collar section that is located further on the outer-diameter side than the grinding-relief groove. Also, a moment load is not applied to the grinding-relief groove when processing the crimped section. The load applied to this grinding-relief groove is limited to just the load due to the contact between the cylindrical section for the tapered rollers and the outside end surface of the large-diameter-side collar section that occurs when pre-loading is applied to the tapered rollers. Therefore, it becomes more difficult for damage to the grinding-relief groove due to cracking or the like to occur, and thus it is possible to reduce the thickness of the large-diameter-side collar section as well as the length dimension of the separate inner-race, and so it is possible to make the rolling-bearing unit for wheel support more compact and lightweight by that amount.

In the case of the rolling-bearing unit for wheel support according to the second feature, the cylindrical section that is formed on the inside end of the hub body can be plastically deformed outward in the radial direction easily, and it is difficult for a large force to act outward in the radial direction on the inside end of the separate inner-race when forming the crimped section by plastically deforming this cylindrical section.

In other words, a small-diameter section is formed around the outer peripheral surface at least on the outside end of cylindrical section, so it makes it possible to easily perform the work of forming the crimped section by plastically deforming the cylindrical section outward in the radial direction without having to heat the cylindrical section.

Moreover, the outside edge of the small-diameter section is located further axially inside than the starting point of the beveled section that is formed to extend on the inner peripheral surface on the inside end of the inner-race, so even when a protrusion is formed on the outside edge of the small-diameter section when forming the crimped section, the protrusion does not apply strong pressure outward in the radial direction on the inner peripheral surface of the inner-race.

Therefore, when forming the crimped section, it is possible to suppress changes in the shape and dimensions of the inner-ring raceway that is formed around the outer peripheral surface of the inner-race, and thus it is possible to construct a rolling-bearing unit for wheel support according to the design values in a stable manner.

Furthermore, by locating the inside edge of the small-diameter section further axially inward than the inside end surface of the inner-race, it is possible to reduce the force in the radial direction applied to the inner-race at the contact portion where the crimped section comes in contact with the inner-race, and thus it is possible to further reduce changes in the inner-race.

Now, the present invention is explained referring to the drawings attached.

Figure 1:
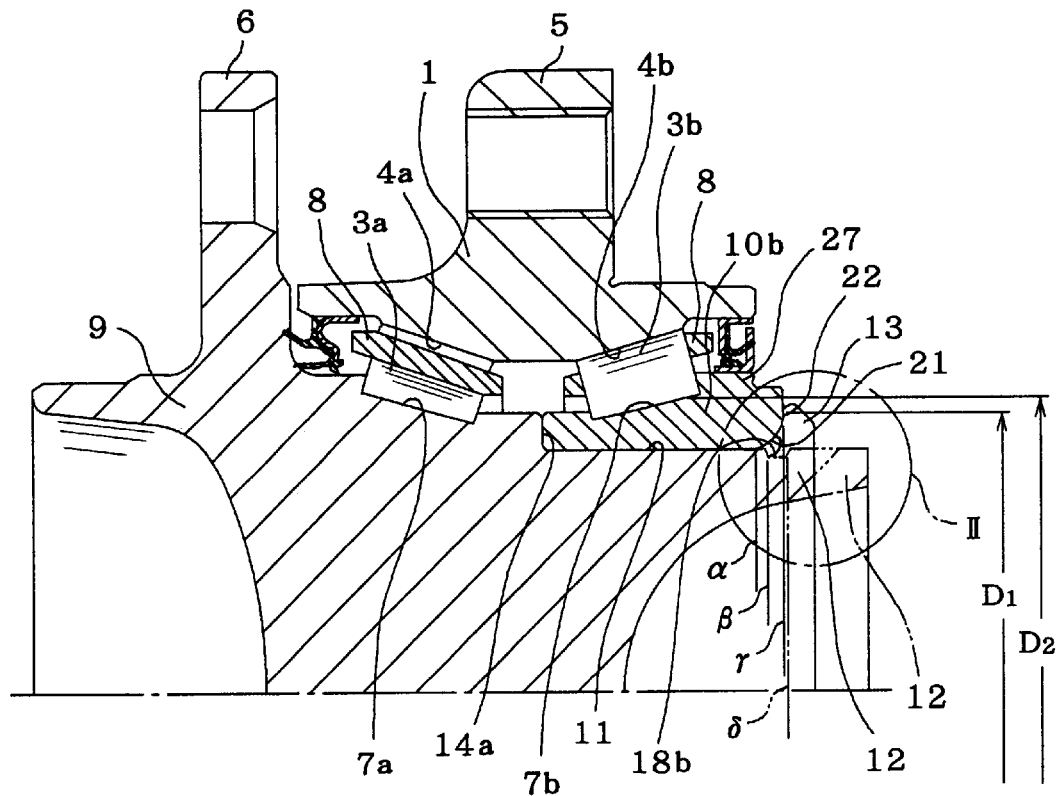
FIG. 1 is a cross sectional view of a half of a first example of the embodiment of this invention.
Figure 2:
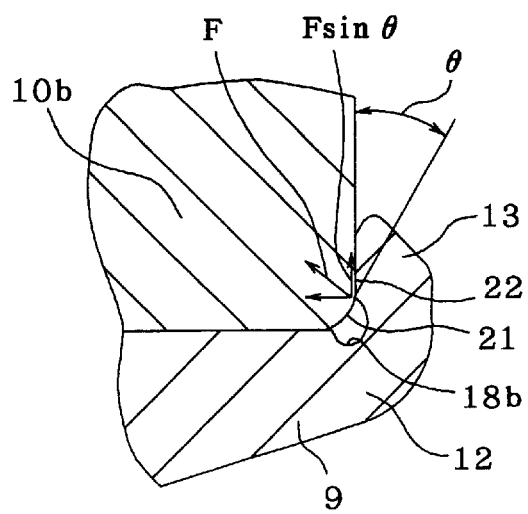
FIG. 2 is an enlarged view of Section II in FIG. 1.

FIG. 1 and FIG. 2 show a first example of the embodiment of the invention. A feature of this embodiment is in the construction that when forming the crimped section 13, a moment load is prevented from being applied to the large-diameter-side collar section 27, that is formed on the inside end of the inside inner-race 10$b$, and also a large force in the outward radial direction is prevented from being applied to the inside end of the inner-race 10$b$. The construction and function of other parts are nearly the same as those of the previously described construction shown in FIG. 7, so the like code numbers will be used for like parts and any redundant explanation is omitted or simplified, and the following explanation will center on the features of this invention. In the case of this embodiment, the rolling-bearing unit for wheel support is used for supporting the non-driven wheels to the suspension, so the hub body 9 is made solid without a spline hole in the center.

In the case of the rolling-bearing unit for wheel support of this embodiment, a beveled section 21, having a ¼ circular arc-shaped cross section, is formed around the inner peripheral surface on the inside end of the inner-race 10$b$ such that the inner diameter gradually increases toward the inside end. In addition, a concave groove section 18$b$, which is a small-diameter section, is formed all the way around the outer peripheral surface on the outside end (base end) of the cylindrical section 12 that is formed on the inside end of the hub body 9. In this invention, the outside edge of the concave groove 18$b$, that is the staring point of the small-diameter section, is located further axially inward than the starting point of the beveled section 21. In other words, the starting point of the beveled section 21 is located at the position $\alpha$ in FIG. 1, and the outside edge of the concave groove 18$c$ is located at position $\beta$ in FIG. 1, which is further inward in the axial direction than position $\alpha$. Therefore, in the state before the cylindrical section 12 is deformed plastically outward in the radial direction, there is a gap between the outer peripheral surface of the cylindrical section 12 and the inner peripheral surface of the inner-race 10$b$ at the position of the outside edge of the concave groove 18$b$ (there is no contact between these peripheral surfaces).

Furthermore, in the case of this embodiment, in the state before the cylindrical section 12 is deformed plastically outward in the radial direction as shown by the dot-dash line in FIG. 1, the inside edge (end point) of the concave groove 18$b$ is located further axially inward than the inside end surface 22 of the inner-race 10$b$. In other words, the inside end surface 22 of the inner-race 10$b$ is located at position $\gamma$ in FIG. 1, and the inside edge of the concave groove 18$b$ is located at position $\delta$ in FIG. 1, which is further inward in the axial direction than position $\gamma$.

With the rolling-bearing unit for wheel support of the embodiment described above, the cylindrical section 12 that is formed on the inside end of the hub body 9 easily deforms plastically outward in the radial direction, thus when forming the crimped section 13 by plastically deforming the cylindrical section 12, it is possible to prevent a moment load from being applied to the large-diameter-side collar section 27 that is formed on the inside end of the inner-race 10$b$, and it is difficult for a large force to act outward in the radial direction on the inside end of the inner-race 10$b$.

In other words, a concave groove section 18$c$ is formed around the outer peripheral surface on the inside end of the cylindrical section 12, so that the work of forming the crimped section 13 by plastically deforming the cylindrical section 12 outward in the radial direction can be performed easily without heating the cylindrical section 12.

Figure 10:
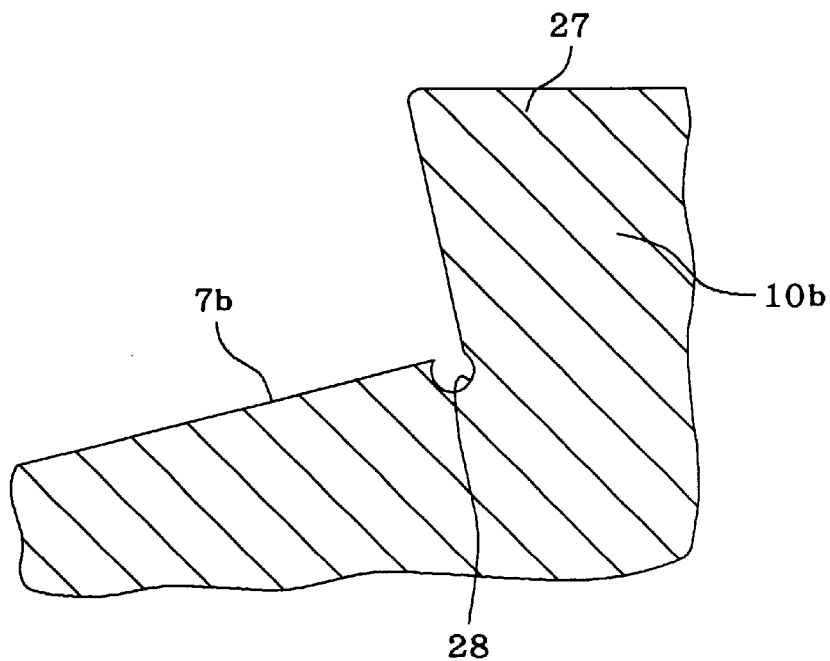
FIG. 10 is an enlarged view of Portion X in FIG. 7.
Figure 11:
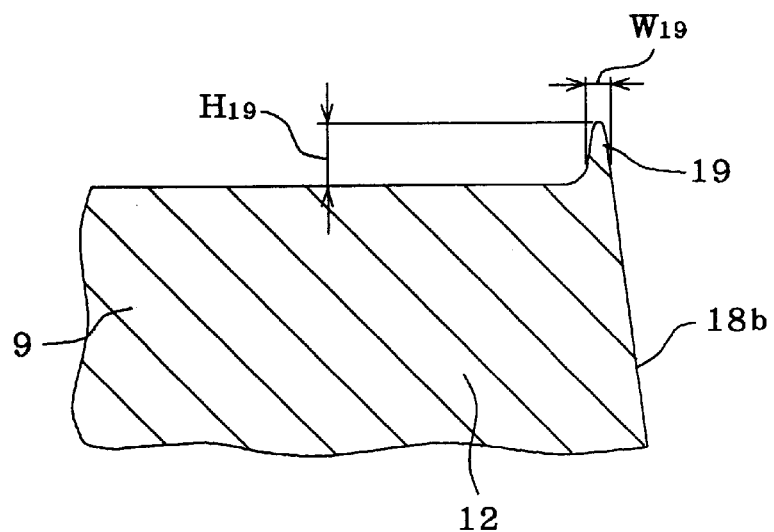
FIG. 11 is an enlarged cross sectional view to show a protrusion formed on the periphery at the outside end of the small-diameter portion as the crimped portion is formed.

The outside edge of the concave groove 18$c$ is located further axially inward than the starting point of the beveled section 21 that is formed to extend on the inner peripheral surface of the inside end of the inner-race 10$b$, so that even when a protrusion 19, such as shown in FIG. 10, is formed on the outside edge of the concave groove 18$b$ when forming the crimped section 13, the protrusion 19 will not apply strong pressure outward in the radial direction on the inner peripheral surface of the inner-race 10$b$. Therefore, it is possible to suppress changes in shape and dimension of the inner-ring raceway 7$b$ that is formed around the outer peripheral surface of the inner-race 10$b$, making it possible to construct a rolling-bearing unit for wheel support in a stable manner according to the design values. Particularly, in the case of this embodiment, it is possible to prevent high surface pressure due to edge loading from being applied on the rolling contact area between the inner-ring raceway 7b and the rolling elements 3 by keeping the amount of crowning performed on the inner-ring raceway 7b at a proper value, and thus it is possible to maintain the rolling fatigue life of the inner-ring raceway 7b.

Moreover, in the case of this embodiment, the inside edge of the concave groove 18b is located further axially inward than the inside end surface of the inner-race 10b, so that it is possible to reduce the force in the radial direction that is applied to the inner-race 10b where the crimped section 13 comes in contact with the inner-race 10b. In other words, the cylindrical section 12 is plastically deformed outward in the radial direction by the amount that the inside edge of the concave groove 18c is located further axially inward, so that the crimped section 13 is formed such that when the inner-race 10b is retained by the crimped section 13, then the all or main portion of the area of contact between the crimped section 13 and the inner-race 10 is located at a portion in the inside end surface 22 of the inner race 10b further outward in the radial direction than the beveled section 21. This inside end surface 22 is located on a imaginary plane that is orthogonal to the center axis of the inner-race 10b, and even when the crimped section 13 presses strongly against this inside end surface 22, there is no outward force in the radial direction applied to the inner-race 10b. Part of the crimped section 13 closer to its inner periphery may come in contact with the beveled section 21 and press against it (with a force F for example), however, as shown in FIG. 2, even in that case, the complementary angle θ of the angle between the direction of the force F that is applied to that contact section and the aforementioned imaginary plane is small in value. Therefore, the force that presses outward in the radial direction against the inside end of the inner-race 10b, which is expressed by F·sin θ, is also a small value, and therefore the deformation in the radial direction of the inner-race 10b can be reduced even more.

Furthermore, the maximum diameter $D_1$ of the circular section where the inside end surface 22 of the inner-race 10b comes in contact with the crimped section 13 is less than the diameter $D_2$ of the circle defined by the bottom of the grinding-relief groove that is formed in the end on the large-diameter side of the inner-ring raceway 7b that is formed around the outer peripheral surface of the inner-race 10b ($D_1 < D_2$). With this construction, when forming the crimped section 13 by plastically deforming the cylindrical section 12 by rotation forging crimping using an upper-die rocking rotation method (generally called "rocking crimping"), in which crimping is performed by moving the center axis of a crimping tool in a rocking manner, there is no large moment load applied to the grinding-relief groove, even when a large axial load is applied to the inside end surface 22 of the inner-race 10b. Therefore, when forming the crimped section 13, it becomes difficult for damage such as cracking to occur in the area of the grinding-relieve groove where the strength in this area is thought to be low, so the collar does not break at the area of the grinding-relief groove, making it possible to improve the product yield. Also, since the angle of the large-diameter-side collar section 27 that is formed around the outer peripheral surface on the inside end of the inner-race 10b does not change when forming the crimped section 13, it is possible to prevent the pre-load applied to the rolling elements 3 from shifting from the design value when forming the crimped section 13.

There are many crimping methods that can be used for forming the crimped section on the inside end of the hub, such as a lower-die drive rotation method of rotation-forging crimping, as disclosed in international patent disclosure WO 98/58762, in which crimping is performed by rotating the hub on which the crimped section is to be formed. However, no matter which method is used and although there are differences in degree, a large axial load would be applied to the inside end surface of the inner-race, which is separate from the hub, when plastically deforming the inside end of the hub to form the crimped section. Therefore, no matter which method is adopted as the method for forming the crimped section, it is possible to obtain results similar to those obtained by using the rocking crimping method.

Figure 3:
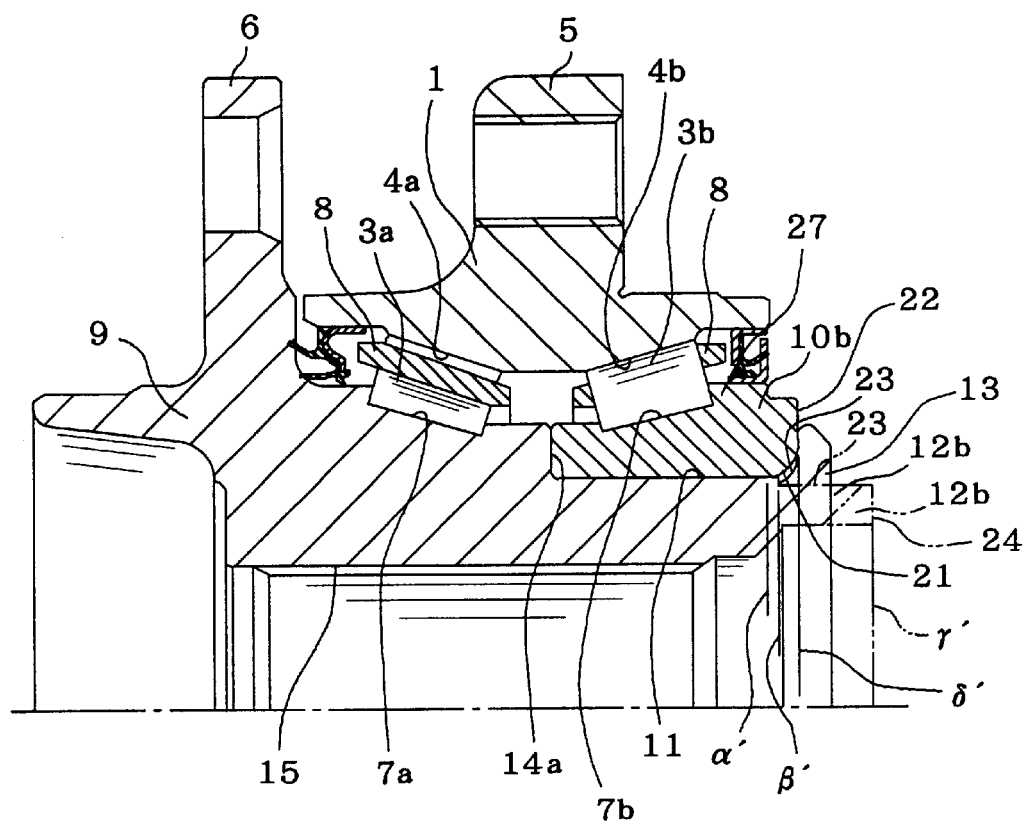
FIG. 3 is a cross sectional view of a half of a second example of the embodiment of this invention.

Next, FIG. 3 shows a second example of the embodiment of the invention. In this example, a small-diameter section 23 that reaches the inside end surface 24 of a cylindrical section 12 is formed around the cylindrical section 12 that is formed on the inside end of the hub body 9. In the case of this example, the outside edge (base edge) of the small-diameter section 23 is at position β' in FIG. 3 further inward in the axial direction than the starting point, at position α' in FIG. 3, of the beveled section 21 that is formed on the inner peripheral surface of the inside end of the inner-race 10b. Therefore, before plastic deformation outward in the radial direction of the cylindrical section 12, there is a gap between the outer peripheral surface of the cylindrical section 12 and the inner peripheral surface of the inner-race 10b at the outside edge position of the small-diameter section 23 (there is no contact between these peripheral surfaces).

Also, in the case of this example, before the cylindrical section 12 has been plastically deformed outward in the radial direction, as shown by the dot-dash line in FIG. 3, the inside edge (end point) of the small-diameter section 23, that is the inside end surface 24 of the cylindrical section 12 is located further axially inward than the inside end surface of the inner-race 10b. In other words, the inside end surface 22 of the inner-race 10b is at position γ' in FIG. 3, and the inside edge of the small diameter section 23 is at position δ' in FIG. 3 further inward in the axial direction than this position γ'. Also, the maximum diameter of the section where the crimped section 13 comes in contact with the inside end surface 22 of the inner-race 10b is smaller than the diameter of the circle defined by the bottom of the grinding-relief groove that is formed at the end on the large-diameter-side of the inner-ring raceway 7b that formed around the outer peripheral surface of the inner-race 10b.

In the case of this example, the rolling-bearing unit for wheel supports is used for supporting the driven wheels, so there is a spline hole 15 in the center of the hub body 9. Also, in contrast to the tapered shape of the inner peripheral surface of the cylindrical section 12 in the first example described above, in the case of this example, the inner peripheral surface of the cylindrical section 12 has a cylindrical shape.

The other construction and functions are substantially the same as in the case of the first example, so the same code numbers are given to identical parts and any redundant explanation is omitted.

Of course the construction of this example can be applied to construction for non-driven wheels as shown in FIG. 1, and similarly, the construction shown in FIG. 1 can be applied to driven wheels.

Figure 4:
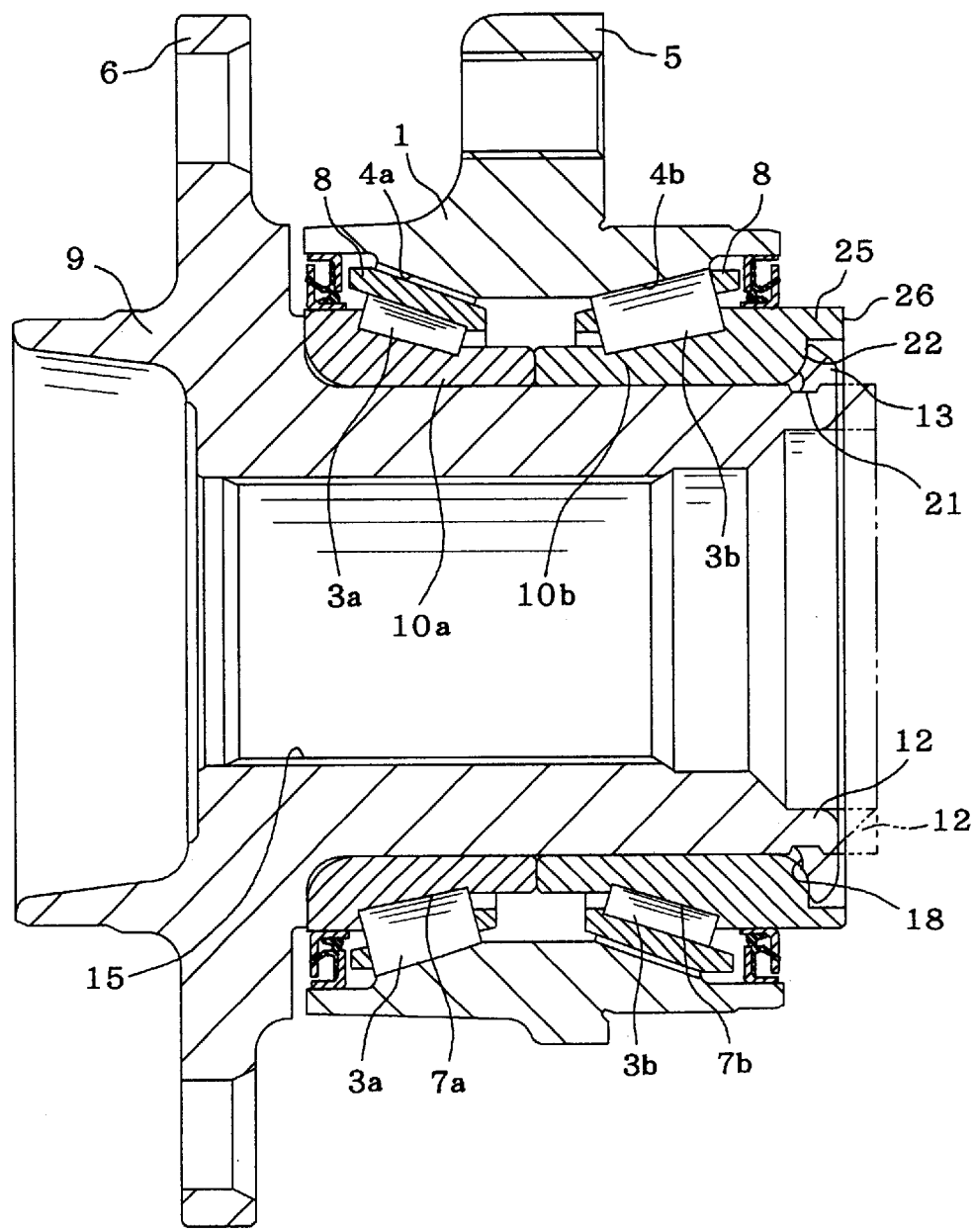
FIG. 4 is a cross sectional view of a third example of the embodiment of this invention.

Next, FIG. 4 shows a third example of the embodiment of the invention. In the case of this example, a pair of inner-races 10a, 10d are fitted around the outer peripheral surface of the hub body 9. Of these, a beveled section 21 is formed on the inner peripheral surface on the inside end of the inside inner-race 10d, and a cylindrical section is formed all the way around on a portion closer to the outer periphery of the inside end surface 22 of this inner-race 10b. Also, the inside end surface 26 of the cylindrical section 25 is located further inward in the axial direction than the inside end surface of the crimped section 13. Moreover, in the case of this embodiment, the rolling-bearing unit for wheel support is used for supporting driven wheels, so that there is a spline hole 15 in the center of the hub body 9.

When the construction of this example is installed in an automobile, the outside end surface of the housing of a constant-velocity joint (not shown in the figures) comes in contact with the inside end surface 26 of the cylindrical section. Moreover, the outside end surface of this housing does not come in contact with the inside end surface of the crimped section 13. The cylindrical section 25 and the inner-race 10b are made of a hard metal such as bearing steel, and the shape of the inside end surface is precision finished. Therefore, it is possible to stabilize the state of contact, in comparison with when the outside end surface of the housing comes in contact with the inside end surface of the crimped section that is made of a relatively soft steel and unstable in shape.

The positional relationship between the concave groove 18, which is formed on the outer peripheral surface of the cylindrical section 12 on the inside end surface of the hub body 9, and the inner-race 10b, and the relationship between the maximum outer diameter of the portion where the inside end surface 22 of the inner-race 10b comes in contact with the crimped section 13 and the diameter of the circle defined by the bottom of the grinding-relief groove that is formed on the inner-race 10b are substantially the same as in the case of the first example, so the like code numbers are given to like parts and any redundant explanation is omitted. Of course, the construction of this example can also be applied to non-driven wheels as shown in FIG. 1.

In the case of the invention, in the second feature described above is not limited to a rolling-bearing unit that uses tapered rollers as the rolling elements, but can also be applied to a rolling-bearing unit that uses balls.

Figure 5:
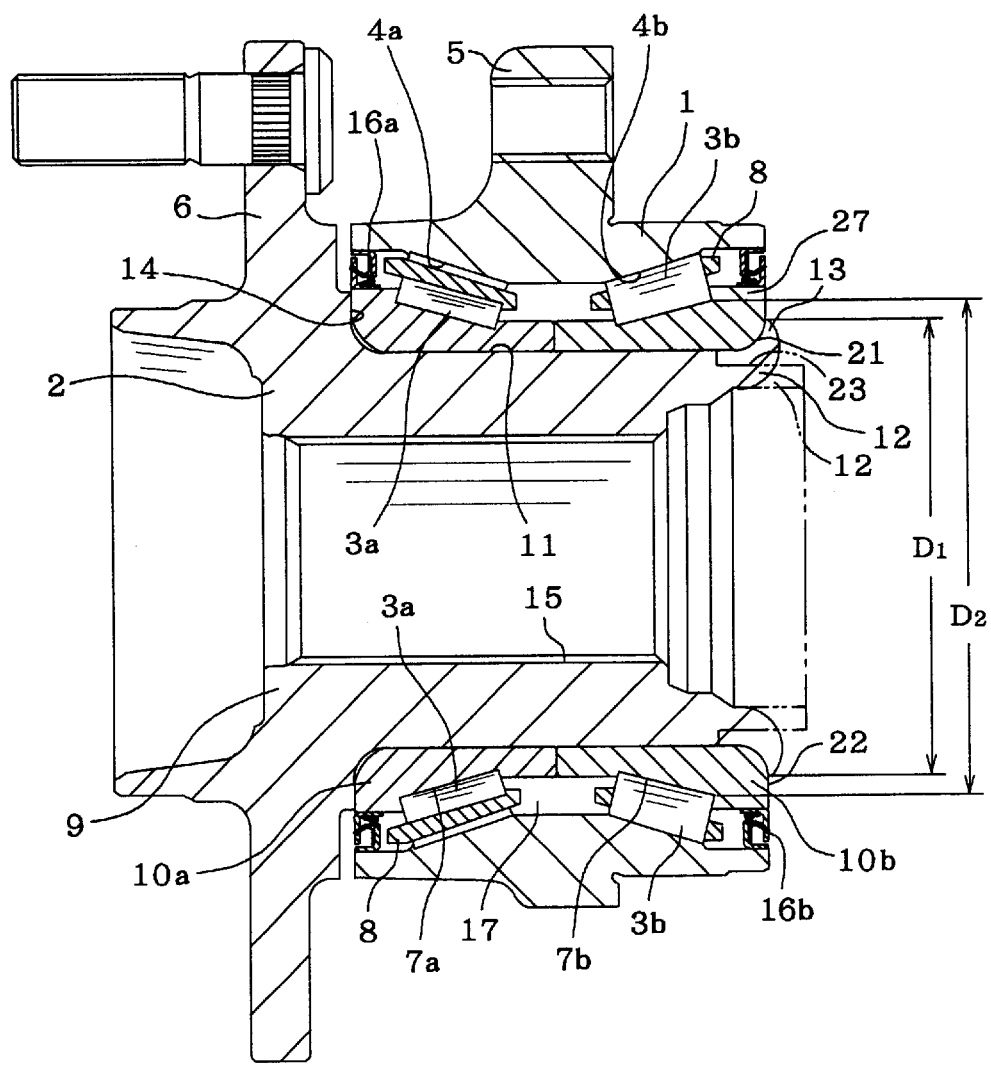
FIG. 5 is a cross sectional view of a fourth example of the embodiment of this invention.

Next, FIG. 5 shows a fourth example of the embodiment of the invention that corresponds to the first feature. The construction of this example assumes that the work of forming the crimped section 13 on the inside end of the hub 9 is performed by a lower-die rotation drive type of rotation-forging crimping. In the case of this lower-die rotation drive type of rotation-forging crimping, it is possible to use a smaller crimping load for plastically deforming the cylindrical section 12 that is formed on the inside end of the hub 9e than in the case of rocking crimping. Also, it is possible to keep the amount of deformation of the inside inner-race 10b that occurs when forming the crimped section 13 less than in the case of rocking crimping.

This example, which takes into consideration suppressing the deformation of the inner-race 10b that occurs when forming the crimped section 13, differs from the first through third examples that corresponded to the second feature in that the outside end of the small-diameter section 23 that is formed around the outer peripheral surface of the cylindrical section 12 is located further outward in the axial direction than the starting position of the beveled section 21 that is formed to extend on the inner peripheral surface of the inside end of the inner-race 10b. In the case of this example, after the crimped section 13 has been processed, the outer peripheral surface of the base end of the crimped section 13 comes in close contact with the inner peripheral surface of the inner-race 10b such that there is no space between them, and is such that maintaining rigidity of the crimped section 13 has priority over preventing deformation of the inner-race 10b. The reason for also forming a small-diameter section 23 in this example, is so that it is possible to shorten the length that the inner-race 10b can move in the axial direction when fitting the inner-race 10b around the inside end of the hub 9 in an interference fit, such as to make it possible to more easily fit the inner-race 10b onto the inside end of the hub 9. Therefore, the difference in the outer diameter of the small-diameter section 23 and the outer diameter of the inside end of the hub 9 at the portion where the inner-race 10b fits over it is a small value of about 0.1 mm. The reason for this is so that when the crimped section 13 is formed by plastically deforming the cylindrical section 12, the crimped section 13 will come in close contact with the beveled section 21, that is formed on the inner peripheral surface on the inside end of the inner-race 10b, without any space between them.

In this example as well, the relationship between the diameter of the crimped section 13 and the diameter of the inner-race 10b is regulated substantially in the same ways as in the case of the first example shown in FIG. 1. In other words, the maximum diameter $D_1$ of the section where the inside end surface 22 of the inner-race 10b comes in contact with the crimped section 13 is less than the diameter $D_2$ of the circle defined by the bottom of the grinding-relief groove that is formed at the end on the large-diameter side of the inner-ring raceway 7b that is formed around the outer peripheral surface of the inner-race 10b ($D_1 < D_2$).

With this construction, when forming the crimped section 13 by plastically deforming the cylindrical section 12 by rotation-forging crimping using a lower-die-drive method, there is no large moment load applied to the grinding-relief groove, even when a large axial load is applied to the inside end surface 22 of the inner-race 10b. There is only a relatively small moment load applied to the grinding-relief groove due to contact between the side surface of the large-diameter-side collar section 27 and the cylindrical section for the rolling elements 3a, 3b when pre-loading is applied.

Similar to the first example described previously, it becomes difficult for damage such as cracking to occur in the area of the grinding-relieve groove when forming the crimped section 13, and so the inner-race 10b does not break at the area of the grinding-relief groove where the strength in this area is thought to be low, making it possible to improve the product yield. In this case, the thickness dimension of the large-diameter-side collar section 27 that is formed on the outer peripheral surface on the inside end of the inner-race 10b does not need to be made larger than that originally required for a rolling-bearing unit for wheel support. Therefore, in this example, when construction of fitting a pair of inner-races 10a, 10b around the hub body 9 is adopted, common parts can be used for the outside inner-race 10a and inside inner-race 10b, making it possible to reduce cost by that amount. In addition, the angle of the large-diameter-side collar section 27 does not change when processing the crimped section 13, so it is also possible to prevent the pre-load applied to the rolling elements from changing from the design value when forming the crimped section 13.

This invention, constructed and functioning as described above, makes it possible to make a rolling-bearing unit for wheel support more compact and lightweight while at the same time maintain durability (in the case of invention according to the first feature), as well as, it simplifies manufacturing and also makes it possible for a rolling-bearing unit for wheel support that has excellent durability (in the case of invention according to the second feature).

What is claimed is:

1. A rolling-bearing unit for wheel support comprising:

an outer-race having an inner peripheral surface formed with a double row of tapered and concave-shaped outer-ring raceways thereon, a hub comprising a hub body having an outer peripheral surface, an outside end portion, a middle portion and an inside end portion, the outer peripheral surface at the middle portion formed with an outside inner-ring raceway directly thereon or on an inner race thereon, and a separate inner-race having an inside end, an outside end and an outer peripheral surface formed with an inside inner-ring raceway thereon to have a diameter which becomes larger toward the inside end thereof, and a plurality of tapered rollers provided between the inner-ring raceways and the outer-ring raceways respectively, the inside end of the separate inner-race formed with a large-diameter-side collar section with a side surface, the outer peripheral surface at the outside end portion of the hub body formed with a flange for supporting a wheel, the inside end portion of the hub body formed with a cylindrical section, the outer peripheral surface at least the inner end portion of the hub body formed with a support-step section which the separate inner-race is fitted onto, the cylindrical section plastically deformed radially outward to form a crimped section, the support-step section having an outside end portion formed with a step surface, the outside and inside ends of the separate inner-race having an end surface, respectively, the separate inner-race fixed and supported by the support-step section such that the end surface of the outside end of the separate inner-race is abutted to the step surface, and that the end surface of the inner end of the separate inner-race is retained by the crimped section at a contact area, and the inner-ring raceway of the separate inner-race connected to the side surface of the large-diameter-side collar section through a connecting portion which is provided with a grinding-relief groove having a bottom with a diameter defined thereby, and wherein the contact area between the end surface of the inside end of the separate inner ring and the crimped section has a maximum diameter smaller than the diameter defined by the bottom of the grinding-relief groove.

2. A rolling-bearing unit for wheel support comprising:

an outer-race having an inner peripheral surface formed with a double row of outer-ring raceways onto, a hub comprising a hub body having an outer peripheral surface, an outside end portion, a middle portion and an inside end portion, the outer peripheral surface at the middle portion formed with an outside inner-ring raceway directly thereon or on an inner race thereon, and a separate inner-race having an inside end, an outside end and an outer peripheral surface formed with an inside inner-ring raceway thereon, a plurality of tapered rollers provided between the inner-ring raceways and the outer-ring raceways respectively, the outer peripheral surface at the outside end portion of the hub body formed with a flange for supporting a wheel, the inside end portion of the hub body formed with a cylindrical section, which has an outer peripheral surface formed with a concave groove section at least at an outside end portion thereof, the outer peripheral surface at least the inner end portion of the hub body formed with a support-step section which the separate inner-race is fitted onto, the cylindrical section plastically deformed radially outward to form a crimped section, the support-step section having an outside end portion formed with a step surface, the outside and inside ends of the separate inner-race having an end surface, respectively, the separate inner-race fixed and supported by the support-step section such that the end surface of the outside end of the separate inner-race is abutted to the step surface, and that the end surface of the inner end of the separate inner-race is retained by the crimped section at a contact area, and wherein the inner peripheral surface of the separate inner-race at the inside end thereof is formed with a beveled section extending from a point and having an inner diameter becoming larger toward the inside end thereof, and wherein the outside end of the concave groove section of the hub body is located axially on the inside of the point from which the beveled section extends.

3. The rolling-bearing unit for wheel support of claim 2, wherein the inside end of the concave groove section is located axially on the inside of the surface of the inside end of the separate inner-race in the state before the cylindrical section is plastically deformed.

* * * * *